United States Patent Office 3,488,261
Patented Jan. 6, 1970

3,488,261
VAPOR COMPRESSION EVAPORATION WITH VENT CONDENSER AND ENGINE EXHAUST GAS BOILER
Frederick A. Loebel, Milwaukee, Wis., assignor to Aqua-Chem, Inc., a corporation of Wisconsin
Filed Jan. 30, 1967, Ser. No. 612,519
Int. Cl. C02b 1/04; B01d 3/00; F28b
U.S. Cl. 203—26        13 Claims

ABSTRACT OF THE DISCLOSURE

A vapor compression unit for removing impurities from liquids is provided with an evaporator chamber, a vapor compressor, and a power source which can also act as a heat source. The unit provides for incorporating the vent condenser in the outlet portion of the manifold on the tube bundle associated with the evaporator so that uncondensed vapors exiting from the tube bundle of the evaporator pass immediately over the vent condenser to further condense the vapors prior to exhausting the uncondensed vapors and noncondensibles to the atmosphere. The unit also includes an exhaust gas boiler in the evaporator chamber whereby exhaust gases from the power source are used to generate additional vapors for the system.

---

This invention relates to a method and apparatus for removing impurities from liquids and more particularly, to a new, novel and compact vapor compression unit and the method of operation thereof for purifying water.

Vapor compression units currently in use employ an evaporator chamber for creating steam, which steam is compressed to enable its use as a primary source of heat in said evaporator chamber. The compressed steam is condensed, transferring its heat to the boiling liquid by means of an indirect contact heat transfer element such as a tube bundle. Some units provide a vent condenser in the form of a separate heat exchanger wherein feed water is used to recover heat from steam associated with the non-condensable gases which must be purged from the system in order to maintain efficient heat transfer in the said heat transfer element in which the major portion of the compressed vapors are condensed.

Many prior systems suffered from the problem of non-condensable gases accumulating on the heat transfer surfaces, thereby reducing the efficient heat transfer through the surfaces to the impure liquid or spray in the evaporator chamber. In addition, the non-condensable gases, if not purged from the system, have been found to accumulate to a point where the system becomes substantially inoperative.

Other prior art units have included an exhaust gas heat exchanger separate from the primary evaporator chamber, wherein the exhaust gases from an engine are used to provide heat for the system. When prior structures contained either or both the vent condenser and/or the exhause gas heat exchanger separated from the evaporator shell, the resulting structures were bulky, cumbersome and less compact than those herein disclosed. The prior known units required additional piping and in some cases permanent foundation work which added expense and kept the cost of the resulting purified water relatively high. Many potential users of the vapor compression units heretofore in existence have been deterred due to the bulk and/or inefficient nature thereof.

The present invention incorporates into a single compact unit all of the advantageous elements of several prior devices and makes maximum use of each component so as to produce a highly efficient, compact and economical unit. The unit incorporates means in the evaporator shell for adding heat recovered from waste sources to the system and also provides for means in the condensing chamber for recovering condensate from the steam and at the same time purging the condensing chamber of non-condensable gases. The resulting unit has a relatively high efficiency and can be easily moved from location to location without requiring expensive hook-ups or installations.

In addition, the unique arrangement of parts creates a new and novel method of purifying impure water. The steps through the system whereby steam or vapor is formed, compressed, condensed and stored with the highly efficient additions and extractions of heat to and from the impure and pure water creates a unique combination of steps not heretofore contemplated with the prior equipment.

Other objects and advantages of the present invention will be readily apparent from the following description and drawings, in which.

Figure 2:
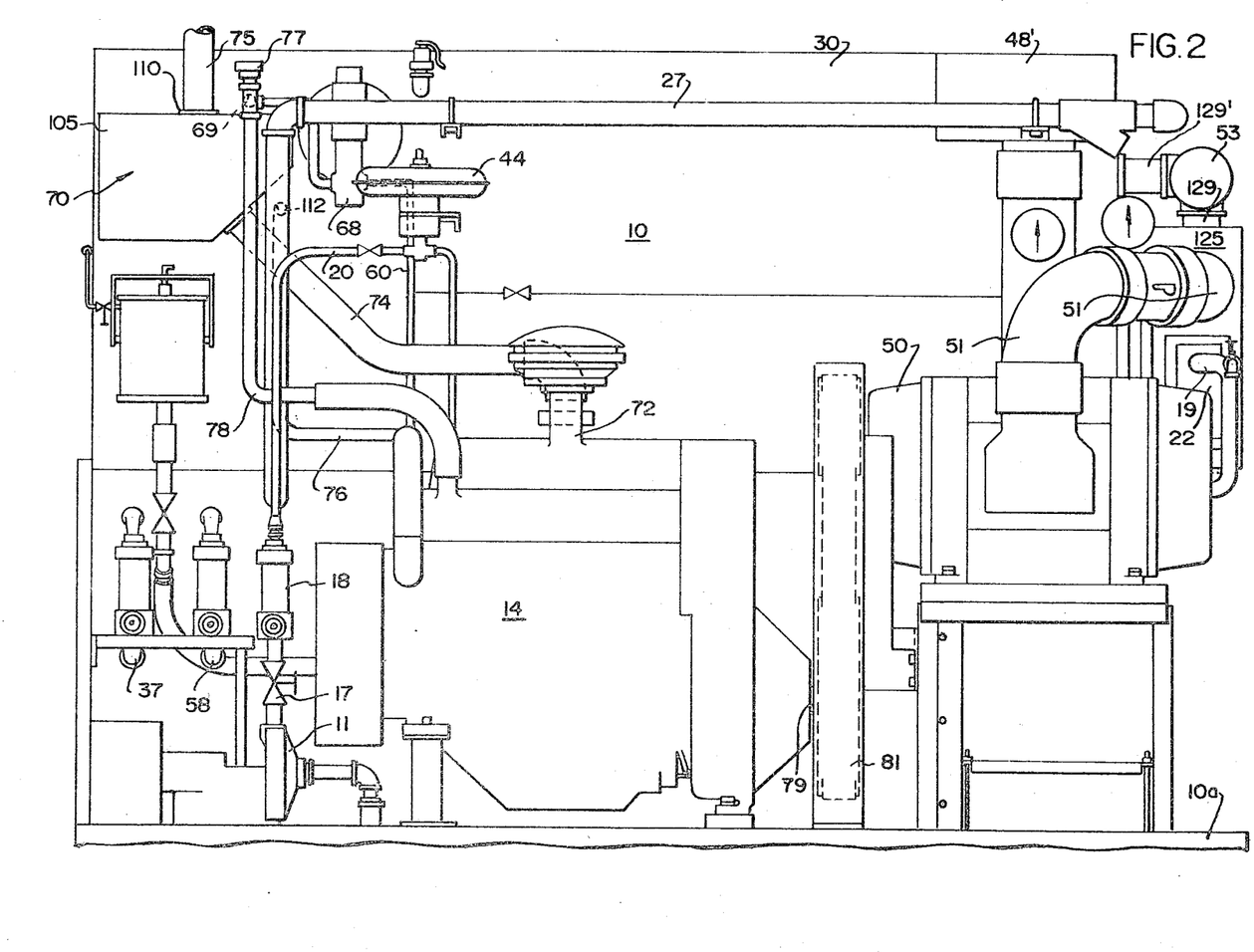
FIGURE 2 is an elevational view of the evaporation apparatus embodying my invention.

The invention will be described in connection with a method and apparatus for use in evaporating steam or vapor from impure liquid such as salt water, brine, or brackish water, which steam or vapor is then compressed and subsequently condensed into pure water. The apparatus consists of a self-contained compact unit 10, as shown in FIGURE 2, which includes its own heat source and power source and which must only be supplied with the impure water that is to be purified. It is believed to be obvious that the device is susceptible of use in purifying any impure liquid or water without departing from the spirit or scope of this invention.

Figure 1:
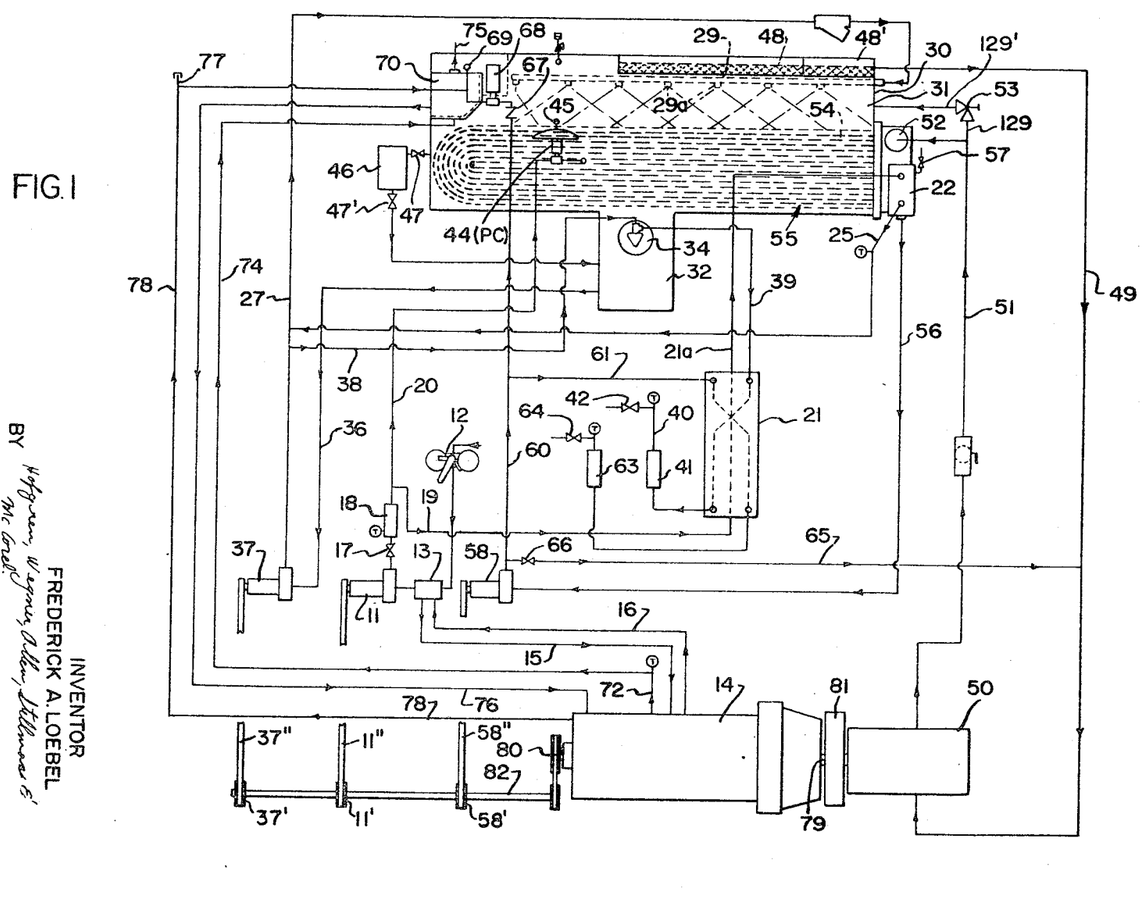
FIGURE 1 is a schematic flow diagram illustrating one form of my improved method for purifying liquids as carried out in the form of apparatus shown in FIGURES 2 through 6.

Referring specifically to the schematic system shown in FIGURE 1, impure feed water such as brine is drawn by a pump 11 into the system through a duplex strainer 12. The feed water is pumped or passed through a heat exchanger 13 where heat is added to said feed water by extracting heat from the cooling and lubricating oil of an engine 14 such as a vapor phase cooled diesel engine. The lubricating oil from engine 14 is circulated to the heat exchanger 13 through pipe 16 and returns to the engine through pipe 15. The feed water which is relatively cool receives heat from the lubricating oil, which oil is in turn cooled by said brine or feed water. The feed water which has received some heat from the heat exchanger 13 is then pumped through a valve 17 to and through a rotometer 18. Beyond the rotometer 18 the feed water can follow one of two paths, either piping 19 or piping 20. Piping 20 leads to the evaporator chamber for a purpose to be described hereinafter. Piping 19 leads to and through a heat exchanger 21 which may be of the plate type from which it passes through piping 21a to the inlet of a vent condenser 22. The feed water passes through the tubes of the vent condenser 22 and exits through the piping 25. The feed water absorbs considerable additional heat in the heat exchanger 21 and in the vent condenser 22 as it acts in heat exchange relation with the blowdown liquid, distillate and compressed vapors as will be described hereinafter. The heated feed water is then passed through the piping 25 to the feed pipe 27 which connects to the spray tube 29 mounted in the evaporator chamber 31 in the evaporator shell 30. A plurality of nozzles 29a are mounted in the spray tube 29 from which the brine or feed water is sprayed into the evaporator chamber 31.

A sump 32 is provided on the lower portion of the shell 30 in communicating relation with the evaporator chamber 31 in which sump a float controlled blow-down valve 34 is mounted. Unevaporated feed water or brine from the evaporator chamber 31 collects in the sump 32 and is drawn from the sump through pipe 36 connected to a pump 37 which is connected to the hereinabove described pipe 27 and spray tube 29 so that the unevaporated brine or feed water from the sump 32 is pumped to the pipe 27 to mix with the feed water coming from pipe 25 as it is pumped to the spray tube 29 and nozzles 29a in evaporator shell 30. The pipe 25 leading from the vent condenser 22 is connected to the pipe 27 to mix feed water from the vent condenser with the unevaporated brine or feed water from the sump 32. A tap in the pipe 27 permits some of the feed water or brine from sump 37 to pass through pipe 38 to the float actuated blow-down valve 34 in the sump chamber 32. The feed-in rate of brine or feed water is controlled by adjusting valve 17 so that more feed water is fed in than is extracted from the system as distillate. As a result of said excess feed-in, brine will accumulate in the sump until the float controlled valve 34 is opened, whereupon the brine from pipe 38 will flow through valve 34, pipe 39, the heat exchanger 21, the pipe 40, the rotometer 41 and valve 42 as it is rejected as blow-down to waste. The feed flow rate is controlled by adjusting valve 17 so as to provide a brine flow as blow-down to waste sufficient to control the concentration of salts in the brine at the desired level. As the blow-down from the sump 32 passes through the heat exchanger 21, waste heat is extracted therefrom and recovered for the system by being added to the feed water passing through the heat exchanger on the way to the vent condenser.

Some of the feed water leaving pump 11 and rotometer 18 may pass through piping 20 to a pressure control valve 44. The upper side of a diaphragm mounted in the control valve 44 is in communication with the inside of the evaporator shell 30 by means of tubing 45. The lower side of said diaphragm is supported by an appropriately calibrated device such that when a predetermined pressure is reached in the evaporator chamber 31, the valve 44 will open and admit feed water through pipe 20 directly into the evaporator chamber 31. Since the feed water or brine from piping 20 is relatively cool, it will cool the inside of the chamber 31 and thereby lower the pressure within said chamber. When the pressure drops to or below the predetermined desired level, the valve 44 will close. The valve 44 is set to control the flow of feed water directly into the evaporator chamber 31 and sump 32 in response to change in gauge pressure in the chamber 31 so as to maintain a nearly constant pressure in the evaporator chamber. The valve 44 is adapted to open a proportionate amount to increase or decrease or cut off altogether the rate of flow of feed water into the evaporator chamber 31.

An acid pot 46 is connected to the evaporator chamber 31 by means of valve 47 and to the sump 32 by means of valve 47'. Periodically the pot 46 is filled with an appropriate acid for use in descaling or in cleaning the system. The valves 47 and 47' are opened and the acid drains into the sump 32 whereby it is permitted to circulate through the system to descale the tubes and reduce the coagulation characteristics of certain sludges. Since pot 46 is sealed when on the line, it is necessary to open both valves 47 and 47' to create the necessary pressure to move the acid into the sump 32.

The steam or vapors from the evaporator chamber 31 are drawn through a plurality of baffles and demisters 48 in the chamber 48' for removing entrained droplets of liquid or fluid. The steam or vapors are then drawn through the pipe 49 to the inlet side of the vapor compressor 50. In the vapor compressor 50 the vapors are compressed and are pumped through the pipe 51 into the steam chest manifold 52 on the end of the evaporator shell 30. A by-pass consisting of valve 53 and pipes 129 and 129' is located in the pipe 51 wherein the compressed vapors can be diverted from the manifold 52 directly into the evaporator chamber 31. The direct injection of vapors into the evaporator chamber is used during start-up of the system so as to add heat to the chamber 31 without withdrawal of a distillate stream. Since the compressor 50 shown is a positive displacement type compressor, the direct injection of steam into chamber 31 reduces the load on the compressor and engine 14 before the unit is up to operating temperature. If other types of compressors are employed, such as the centrifugal type, the by-pass as herein described may not be required. The compressed vapors that enter the manifold 52 are forced through the tubes 54 of the tube bundle 55 in the evaporator chamber 31 wherein heat is given up to the spray contacting the outside of the tubes in the chamber 31 so as to condense the majority of the steam or vapor into distillate. After passing through the tubes of the bundle 55 the remaining steam and vapors pass into the lower half of the steam chest manifold 52 and flow around the tubes of the vent condenser 22 wherein further steam is condensed and the distillate is collected and removed from the vent condenser through the distillate pipe 56. A vent 57 to atmosphere is provided in the vent condenser chamber 22 so as to vent the noncondensable gases to the atmosphere, along with the unevaporated vapors associated therewith. In an evaporation system of water purification it is known that non-condensable gases mix in with the steam and if not purged or extracted from the system they will accumulate in the tubes and reduce the heat transfer ability of the tubes. The use of the exhaust port directly on the vent condenser which is in the maifold of the evaporator shell permits the continuous flow of steam through the tubes and vent condenser to constantly purge the non-condensable gases from the system.

A pump 58 is connected to the distillate pipe 56 for pumping the distillate flowing from the tube bundle 55 and vent condenser 22 into a pipe 60 connected to a pipe 61 which extends to the heat exchanger 21. Distillate is pumped from the manifold 52 to and through the heat exchanger 21. From the heat exchanger 21, the distillate flows to a distillate storage area for storage or for use. A rotometer 63 and valve 64 are positioned in the distillate discharge pipe just ahead of the distillate storage area. A branch pipe 65, having a control valve 66, also connects to the distillate pipe 60 and extends to and connects with the vapor line 49 on the inlet side of the compressor 50. In this way hot distillate can be added to the vapor from the chamber 31 on the way to the compressor 50. The vapor or steam from chamber 31, when compressed by compressor 50, can become superheated and therefore not in a satisfactory state for transmitting heat to the liquid spray in chamber 31. Therefore, addition of liquid distillate to the steam upstream of the compressor permits the compressor to produce saturated steam or vapor which readily gives up its heat in the tube bundle. The pipe 60 also passes through a one-way control valve 67 into a float control valve 68 from which it is connected with the inlet 69 into an exhaust gas boiler 70 for a reason to be described hereinafter.

Connected to an exhaust stack 72 of the engine 14 is an exhaust pipe 74 which runs to an exhaust manifold of the exhaust gas boiler 70. The gases from the engine exhaust pass through the tubes of the exhaust gas boiler and are then exhausted to the atmosphere through the exhaust outlet 75. The engine 14 which in the illustrated form is a vapor phase cooled engine, has two connections for jacket water. As described heretofore, incoming raw feed water is circulated through a heat exchanger 13 for cooling the oil in the cooling system of the engine. A second circulatory system is provided in the engine 14 whereby water is passed through the engine by means of inlet pipe 76 and outlet pipe 78. Pipe 76 admits fresh or pure jacket water to the engine and pipe 78 connects the jacket water from the engine to the tank of the exhaust gas boiler 70. The pipe 78 from the engine 14 is connected to the inlet 69 for circulating the engine jacket water into the tank of the exhaust gas boiler. The jacket water in the exhaust gas boiler surrounds the tubes through which the exhaust gases are being passed to pick up heat from said hot exhaust gases. A filler cap 77 closes the end of the pipe 78 so that prior to initial start-up the cooling system of the engine and the tank of the boiler can all be filled with fresh water. The hot jacket water from the engine forms a source of heat for the boiler 70. The heat from the exhaust gases in the tubes is given up to form steam or vapor in the evaporator chamber 31. The float valve 68 permits make-up water from the distillate side of the system to be added to the tank of the exhaust gas boiler 70 whenever the amount of evaporation from the exhaust gas boiler lowers the level of the jacket water below the predetermined setting of the float valve 68.

The engine 14 has a dual power take-off system with a shaft 79 on one end of the engine connected through a clutch 81 to the vapor compressor 50 and with a shaft 80 on the other end of the engine driving a jack shaft 82, which in turn drives three pulleys, 37', 11' and 58', and belts 37'', 11'' and 58'' for driving the pumps 11, 37 and 58.

With the engine 14 running, the pump 11 pulls input feed water or brine such as brackish water, polluted water or sea water into the system and circulates the feed water through the heat exchanger 13 for cooling the cooling oil of the engine and for receiving heat from the said oil. The feed water or brine, after receiving heat from the engine, is then circulated through the plate type heat exchanger 21 where (when the system is up to operating condition) additional heat will be added to the feed water by heat exchange with the hot distillate and hot blow-down feed water or brine. From the heat exchanger 21 the feed water is pumped through the vent condenser 22. Feed water from the vent condenser 22 is pumped by the pump 37 through line 27 into the spray tube 29 for spraying from nozzles 29a onto the tubes 54 in the evaporator chamber.

Some initial heat for the evaporator chamber 31 is supplied by the steam or vapor released by the jacket water as it is heated by the exhaust gases from the engine passing through the exhaust gas boiler 70. The feed water sprayed from nozzles 29a over the evaporator tubes 54 in the evaporator chambers 30 creates some initial steam or vapor which when added to the vapors created by the jacket water in the exhaust gas boiler combine to produce some initial vapor. The compressor 50, when connected by the clutch 81 to the engine, pulls said initial vapor into the compressor and compresses same. The compressed vapors are then pumped into the steam chest manifold 52 in the evaporator chamber. The heated and compressed steam or vapor is pumped through the tubes 54 in the evaporator chamber 31 giving up heat to the liquid being sprayed from nozzles 29a onto the outside of the tubes in the chamber 31.

As the compressed steam or vapor passes through the tubes 54 in the evaporator chamber, liquid therein is partially condensed and drained off as distillate. The uncondensed steam or vapor passes into and through the vent condenser 22 whereupon additional liquid is condensed from the steam or vapor by means of the heat exchange with the feed water passing through the tubes of the vent condenser. The steam or vapor contains non-condensable gases which if allowed to accumulate in the system, and in particular in the tubes 54, will reduce the heat transfer of the system. The vent 57 connected to the vent condenser 22 permits some of the uncondensed steam to exhaust to the atmosphere, carrying with it the non-condensable gases. The distillate condensed in the tubes 54 and in the vent condenser drains into the bottom of the manifold 52 and is pumped by pump 58 through the pipe 56 through the heat exchanger 21 and into the distillate storage area. Part of the distillate is tapped off for use as make-up water in the exhaust gas boiler 70 upon actuation of the float valve 68.

The unevaporated feed water and in some cases feed water direct from the source through pump 11 and valve 44 is collected in sump 32 in the evaporator chamber and is recirculated in part through the pipe 27 to the spray nozzles 29a with the balance being passed through the valve 34 to the heat exchanger 21 prior to blow-down as waste. The hot unevaporated feed water gives up heat in the heat exchanger 21 to the raw feed water being pumped into the system. In this way substantial amounts of heat from the hot distillate and hot unevaporated feed water to be withdrawn as blow-down from the system is recovered in heating the raw feed water entering the system.

The compressed steam or vapor passing through the tubes of the tube bundle releases heat to the brine or impure water being sprayed over the outside of the tubes in the evaporator chamber. A part of the impure water or brine spray will evaporate into steam upon contact with the hot tubes of the tube bundle. The unevaporated impure water or brine in the evaporator chamber will collect in the sump 32 for recirculation or blow-down. The steam or vapor formed from the evaporation of the impure feed water or brine in the evaporator chamber and from the jacket water in the exhaust gas boiler are drawn through the demisters 48, the chamber 48' and through the pipe 49 to the compressor 50 for compressing and circulating to the steam chest 52 for creating a heat source for more vapor, as is known in the vapor compressor art.

Figure 3:
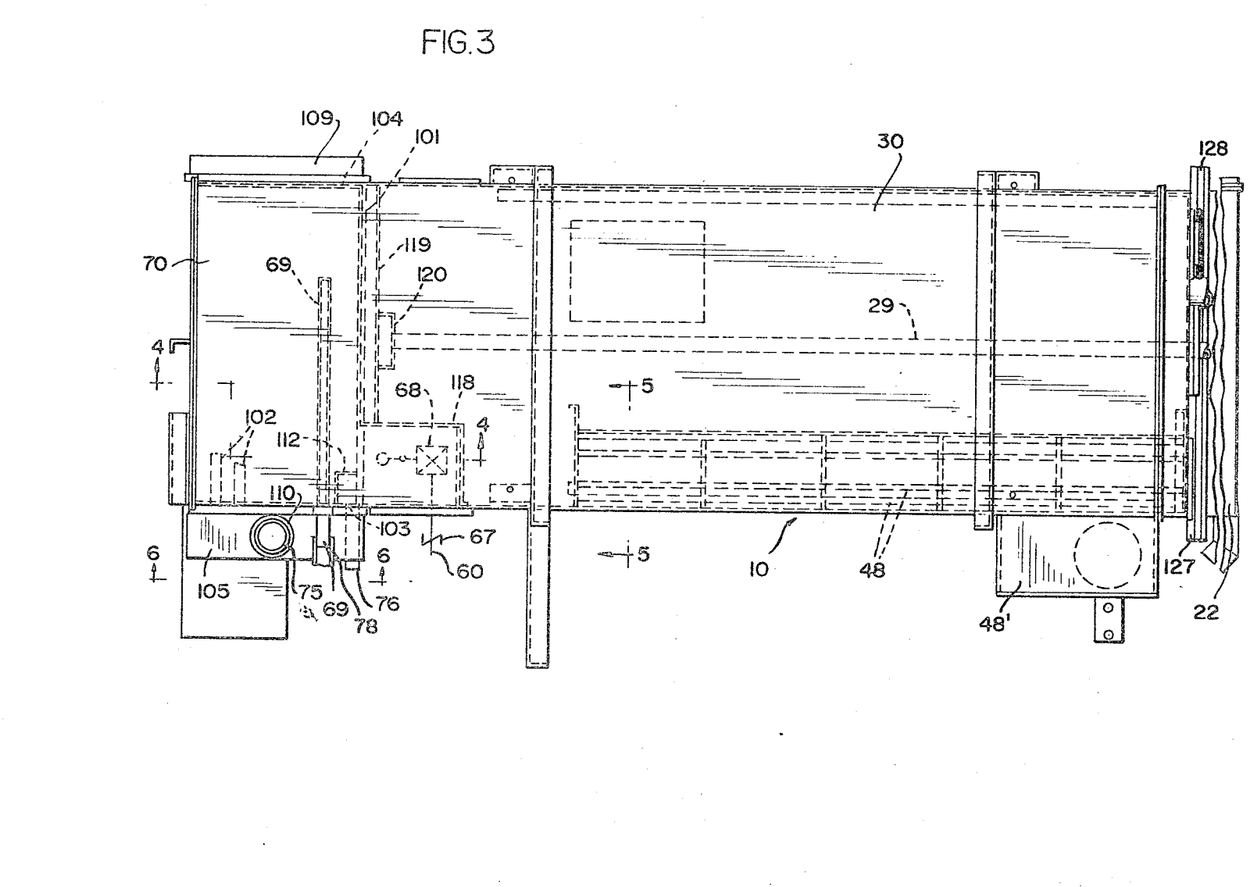
FIGURE 3 is a top plan view of the apparatus of FIGURE 2.

Since the elements of my invention are best understood by reference to the structural arrangement of parts, FIGURES 2 through 8 have been incorporated in this specification for that purpose. The illustrated structural details are to be considered as illustrative only. FIGURES 2 and 3 show the vapor compression unit 10 of the type contemplated by the present invention mounted on a skid or base member 10a. The shell 30 is mounted on the base by means of supports 30a.

On the left-hand portion of the shell 30 is illustrated the exhaust gas boiler 70. The lower right-hand portion of FIGURE 3 illustrates in dotted lines the demisters 48 and the vapor collection chamber 48' which in the side view of FIGURE 2 is located in the upper portion of the evaporator chamber 31 of shell 30. The vent condenser 22 is shown positioned on the right end portion of the figures.

Figures 4, 5, 6, 8:
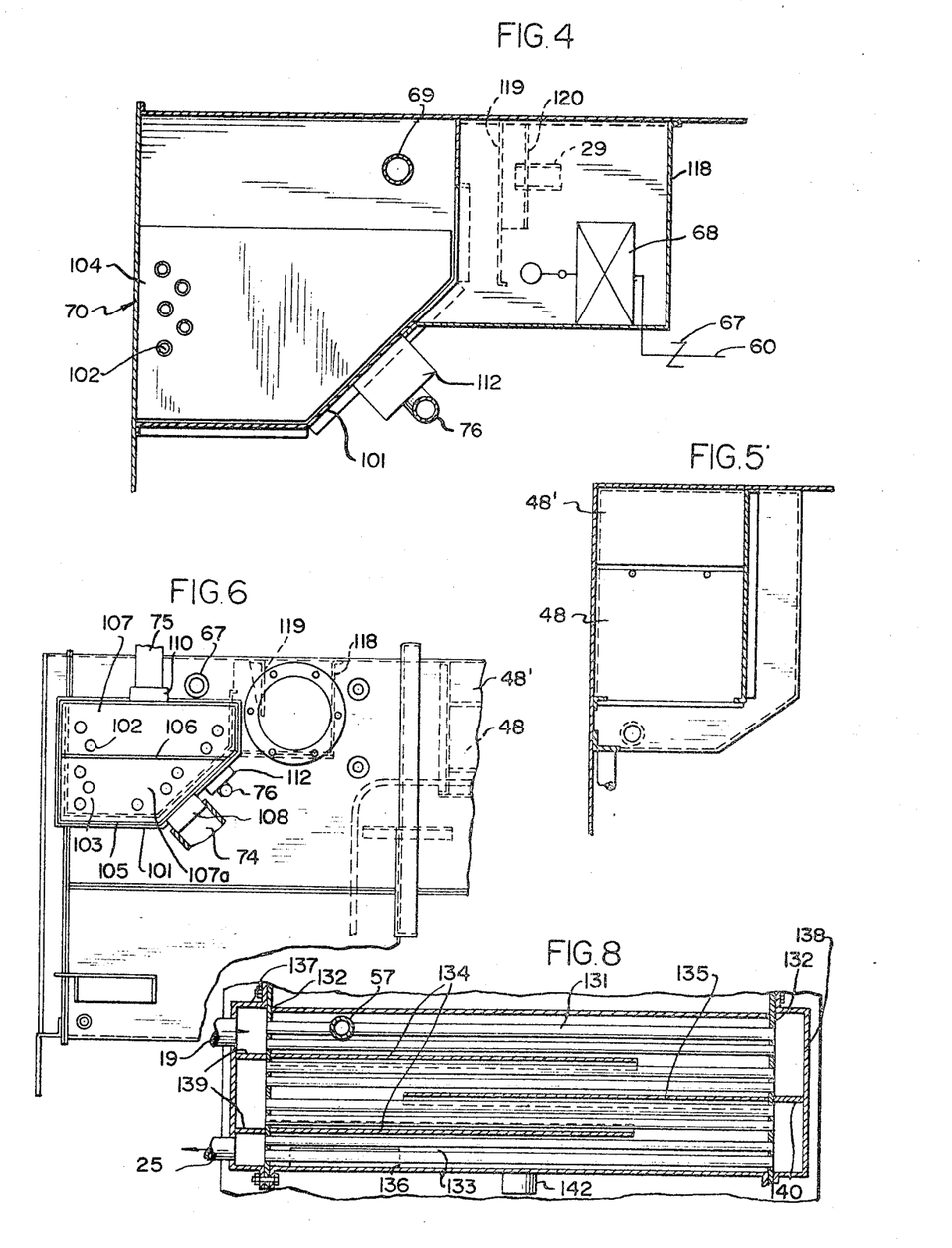
FIGURE 4 is a cross sectional view taken along the lines 4—4 of FIGURE 3.
FIGURE 5 is a cross sectional view taken along the lines 5—5 of FIGURE 3.
FIGURE 6 is a partial cross sectional view taken along the lines 6—6 of FIGURE 3.
FIGURE 8 is a cross sectional view taken along the lines 8—8 of FIGURE 7.

The exhaust gas boiler 70 is best illustrated in FIGURES 3, 4 and 6. The boiler is mounted in the evaporator shell 30 and is comprised of a box-shaped tank 101 fastened between the side walls of the evaporator shell 30. The tank 101 is open at the top in a manner to communicate with the evaporator chamber 31 on the interior of the evaporator shell 30. Tank 101 has a tube bundle consisting of a plurality of tubes 102 passing horizontally between the tube sheets 103 and 104. An exhaust gas manifold 105 is attached to the outer surface of the evaporator shell in alignment with the tube sheet 103. The manifold 105 has a horizontal partition 106 extending across the mid-portion thereof which divides the manifold into an upper portion 107 and a lower portion 107a. A collar 108 extends through the wall of the manifold 105 into communication with the lower portion 107a. Appropriate piping 74 connects the exhaust pipe 72 of the engine 14 with the collar 108 so that the exhaust gases from the engine are blown through the lower portion 107a of the manifold 105 into the lower group of tubes 102 of the tube bundle. A second manifold 109 is fastened to the opposite wall of the evaporator shell in alignment with the tube sheet 104 in encompassing relation with the ends of the tubes 102 such that any gases flowing through the tubes 102 from the lower half 107a of the manifold 105 are directed upwardly within the manifold 109 and into the ends of the tubes 102 in the upper half of the bundle of tubes. The upper half 107 of the manifold 105 has an outlet collar 110 which is connected to the exhaust pipe or stack 75 such that the gases exiting from the tubes 102 in the upper half of the tube bundle enter the upper half 107 of manifold 105 and exit to the atmosphere from the exhaust stack 75.

From the above it can be seen that exhaust gases from the engine are passed into the lower half 107a of the manifold 105 through the lower bank of tubes 102 up in the manifold 109 and back through the upper tubes 102 and out the exhaust stack 75. During the passes through the tubes 102, the hot exhaust gases give up heat to the surrounding tubes in the tube bundle. Jacket water from the engine is piped through pipe 78 to the inlet or distribution pipe 69 which projects into the evaporator chamber through the wall of the shell 30 into a position above the bundle of tubes 102 in the tank 101 of the exhaust gas boiler 70. The jacket water from the engine entering through the inlet 69 is distributed down into the tank 101 and around and over the hot tubes 102 of the exhaust gas boiler. A jacket water outlet 112 is mounted on one wall of the tank 101 of the exhaust gas boiler 70 to which is connected the piping 76 which returns the jacket water to the engine. In this way jacket water from the engine 14 enters the tank 101 of the exhaust gas boiler 70 and is distributed over and around the outside of the tubes 102. Part of the jacket water will be evaporated and part will be returned through piping 76 to the engine. Since heat, principally in the form of steam or vapor from the jacket water, is given off into the evaporator chamber, make-up water must be added to the jacket water to keep the jacket of the engine full of water. The make-up water is added to the tank through a sump 118 (see FIGURE 3) which is connected with one wall of the tank 101 of the exhaust gas boiler and communicates with the inside of said tank 101. A boiler level control valve or float 68 is mounted in the sump 118 and is connected with the distillate line 60 from the pump 58. As the level of the jacket water in the tank 101 falls below a certain point, the valve 68 in the sump 118 opens and permits hot distillate to be added to the jacket water as make-up water.

A baffle 119 extends from the back wall of shell 30 to the inner wall of sump 118 (FIG. 3) and from the roof of the evaporator shell 30 down into the evaporator chamber 31 in overlapping relation with the upper end of the inner wall of the tank 101 (FIGS. 4 and 6). Due to the baffle 119, steam or vapor rising from the tank 101 are forced to flow up over the end of the inner wall and down and around the baffle 119. The baffle 119 has a bracket 120 for supporting the inner end of the spray tube 29. The lower edge of the baffle 119 is below the level of the spray tube 29 so as to prevent feed water spray from getting into the jacket water in the tank 101 of the boiler 70 and thereby contaminate same.

From the above it is believed to be obvious that the heat from the exhaust gases and from the jacket water of the engine contribute to raising the temperature level in the evaporator chamber and contribute steam or vapor to the vapor compression system of the unit.

Figure 7:
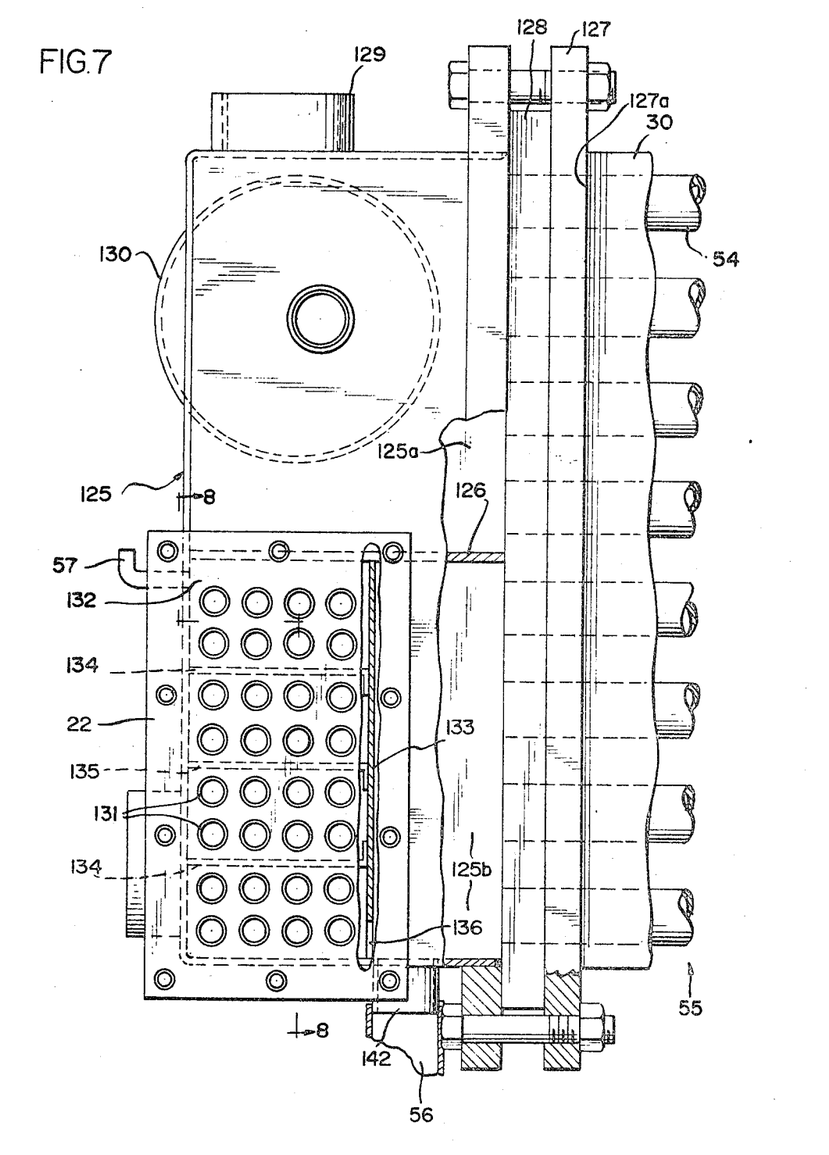
FIGURE 7 is an enlarged cross sectional view of the vent condenser and steam chest manifold taken along the lines 7—7 of FIGURE 8.
Figure 9:
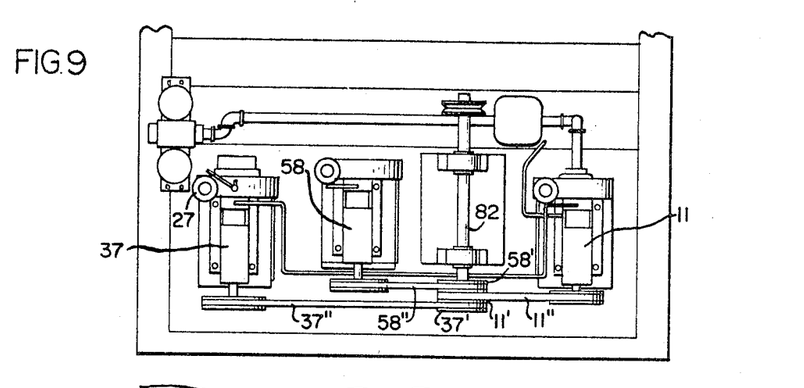
FIGURE 9 is a top view of the portion of the apparatus of FIGURE 10.
Figure 10:
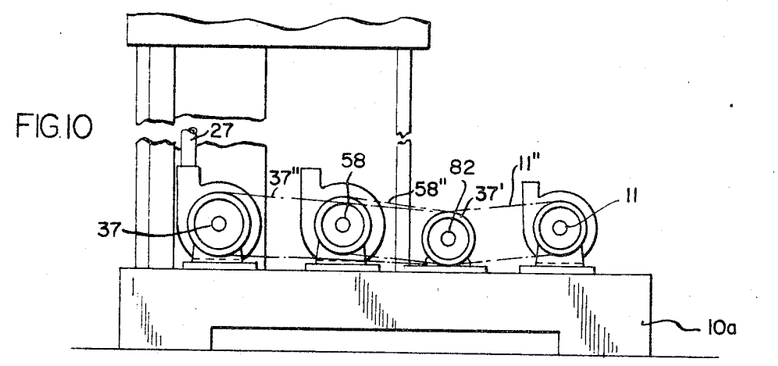
FIGURE 10 is a partial end view of the evaporation apparatus shown in FIGURE 2.
Figure 11:
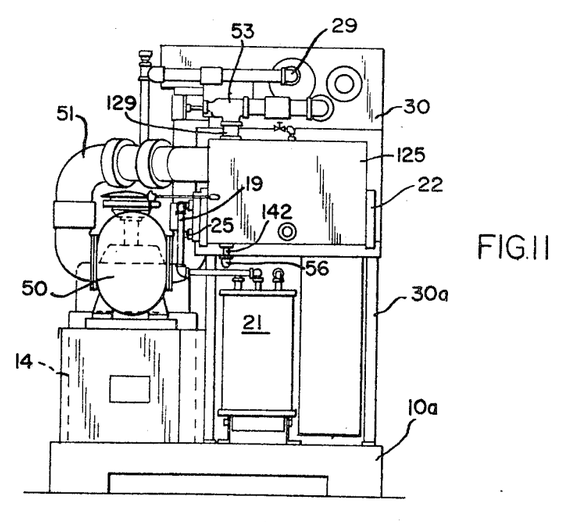
FIGURE 11 is an end view looking in the opposite direction from the view of FIGURE 10 showing the apparatus of FIGURE 2.

FIGURES 7, 8 and 11 illustrate the vent condenser 22 of the invention. That is, the source of heat for the evaporator chamber 31 is supplied by the bundle of tubes 55 which are horizontally disposed U-shaped tubes 54 having the ends of the U seated in a tube sheet 128. The tubes 54 are oriented and stacked so that the one end of the U is in the lower half of the bundle and the other end is in the upper half of the bundle. A flange member 127 is welded or otherwise secured to the outside of the shell 30 around the opening 127a in the shell. The tube bundle 55 is inserted through the opening 127a into the chamber 31 with the tube sheet 128 abutting against the flange member 127. A manifold member 125 is secured to the flange 127 with the edge of the tube sheet 128 pinched between the flange and the manifold 125. The manifold 125 overlaps the open ends of the tubes 54 and has portions spaced from the tube sheet 128. The manifold 125 is divided by a partition 126 into an upper half 125a and a lower half 125b. The upper half 125a is connected through piping 51 to the discharge side of the vapor. In this way the compressed vapors or steam from the compressor 50 enter the upper half 125a of the manifold 125 and are directed into the open ends of the tubes 54. The compressed vapors traverse the U-shaped tubes 54 giving up heat to the tubes and surrounding fluid whereby some of the steam or vapors are condensed to form distillate. The uncondensed vapors and non-condensable gases exit from the lower ends of the tubes 54 into the lower half 125b of the manifold 125 into operative relation with the vent condenser 22.

A bypass connection 129 communicates with the upper half 125a of the manifold 125 and passes directly into the evaporator chamber 31 through bypass valve 53. During initial start-up, the valve 53 is opened and compressed vapors are passed directly into the evaporator chamber. The bypass connection 129 can be directly connected to the piping 51 from the compressor 50 as shown in FIGURE 1.

The vent condenser 22 is composed of a plurality of parallel mounted tubes 131 which are connected at each end to a tube sheet 132. Horizontal partitions or baffles 134, 135 are provided between every other tier of tubes 131, which partitions extend only partway throughout the length of the tubes. The open ends of each baffle 134 are blocked by the intermediate baffle 135, which in turn extends only partway to the opposite wall. The baffles 134, 135 extend across the chamber from the outer wall to the wall 133 between the vent condenser and the lower half 125b of the manifold 125. The overlapping partitions create a tortuous path through which the steam or vapors pass in traversing the outer surfaces of the vent condenser tubes 131. The steam or vapors flowing from the tubes 54 into the lower half 125b of the manifold enter the vent condenser through the opening 136 in the lower part of the wall 133 in close proximity to the exit ends of the feed water carrying tubes 131. The steam or vapors in the vent condenser 22 flow upwardly over the outside of the tubes 131 and around the baffles 134, 135 to condense more vapor. Manifolds 137, 138 are provided on opposite ends of the vent condenser tubes 131 so that the relatively cool feed water enters the manifold 137 through pipe 19 and due to a partition 139, is forced to flow through the top rows of tubes 131 to the opposite manifold 138 which has a partition 140 for diverting the feed water back through the next tier of tubes 131 and so on, until the last tier of tubes 131 is traversed, whereupon the feed water is pumped from the manifold 137 of the vent condenser 22 through pipe 25 to pipe 27 and to nozzles 29a.

The steam or vapors in tube bundle 55 are in large measure condensed into distillate in giving up heat to the feed water spray in the evaporator chamber. The distillate condensing in the tubes 54 runs into the lower half 125b of the manifold 125 and is bled off through distillate outlet 142 which is connected to distillate pipe 56. The compressed steam or vapors entering the upper ends of the tubes 54 pass through the tubes in the evaporator chamber and give up heat to the surrounding area. The uncondensed steam or vapors exit from the lower ends of the tubes 54 carrying with them the entrained non-condensable gases which together pass through opening 136 into contact with the relatively cool surfaces of the tubes 131 in the vent condenser. More steam or vapors are condensed onto the surface of the tubes 54 in the vent condenser, which condensate runs off as distillate from the vent condenser into the outlet 142 in the manifold. Uncondensed steam or vapors and non-condensable gases are exhausted to the atmosphere through the exhaust port 57 connected to the vent condenser 22 near the entry end of the feed water into the top tubes 131 of the tube bundle. Exhausting some uncondensed steam keeps the steam in the tubes 54 flowing so as to purge the non-condensable gases from the system. Removal of the non-condensable gases is important to maintain an efficiently operating system.

The heat exchanger 21 is a three-stream plate type heat exchanger of generally known construction. The relatively cool feed water is passed through the heat exchanger between hot distillate from the vent condenser 22 on one side and hot unevaporated feed water from the sump of the evaporator chamber on the other side. The hot unevaporated feed water from the sump 32 is shown as being passed to waste or blow-down. The incoming feed water absorbs or recovers heat from the hot distillate and hot blow-down fluids, which recovered heat, when taken back into the system helps to keep the heat in balance.

An important part of my improved evaporator apparatus is the compact arrangement of the essential parts in a very limited space without affecting the efficiency of the system. FIGURES 2, 9, 10 and 11 help to illustrate the novel arrangement of parts wherein the evaporator shell 30 has the vent condenser 22 integrally formed in one end portion thereof with the exhaust gas boiler 70 integrally formed on the other end portion. The prime mover 14 is attached to the base 10a either directly, as shown, or by means of vibration isolators and is positioned in close proximity to, but generally below and horizontally disposed to, the shell 30. The compressor 50 is supported between the prime mover 14 and the shell 30 so as to minimize piping and needless exposure of hot parts to atmospheric cooling. The heat exchanger 21 is mounted underneath the shell 30 so that piping to the heat exchanger is kept as short as possible. The heat exchanger 21 can be disconnected and slid in and out from its operative location with the minimum of interference by or with the other operative parts.

The pumps 11, 37 and 58 are driven by belts from the power take-off of the prime mover 14 and are mounted beneath the exhaust gas boiler end of the shell 30 so that the piping between the pumps, prime mover, shell and heat exchanger is minimized and can be connected and disconnected without interference with each other. In addition, the acid pot 46 and operating valves therefor, 47, and 47', are readily accessible together with the various operating valves 44, 68 and the like.

It is believed to be readily apparent that the novel arrangements of elements of the apparatus produces a compact, highly efficient packaged unit capable of use in places having limited space and access area. The unit is also attractive for use with the military where the apparatus can be easily transported from place to place or set up on a location and operated without the need for anything except a source of brackish, saline or impure water.

It is to be understood that any available external source of heat may be substituted for the exhaust gases in the exhaust gas boiler without departing from the spirit of the invention. As an example, electric heating coils have been substituted for the exhaust gas tubes in the tank 101 with the electric coils heating the water and adding steam or vapor to the evaporator chamber. Electric motors have been substituted in place of the engine 14 for driving the three pumps 11, 37 and 58, and for driving the vapor compressor 50. These and other modifications can be made without departing from the spirit of the invention of having an added boiler in the evaporator chamber for adding heat and vapor to the system and of having the vent condenser as an integral part of the evaporator shell and vapor condensing system.

From the above it is believed to be obvious that an improved highly efficient vapor compression arrangement is provided; that is, the vapors from the compressor, after giving up substantial heat to the evaporator chamber, are condensed both in the tubes in the evaporator chamber and in the vent condenser. The relatively cool feed water passing through the tubes in the vent condenser acts as the condensing liquid and receives heat from the condensing vapors, which heat is later used effectively in the system.

In practice, the vapor compression unit is compactly mounted on a relatively small base with the included elements self-contained and generally independent of the outside sources of power. The exhaust gases from the engine are employed to add heat to the system, thereby reducing the amount of waste heat being discharged. A heat exchanger is employed for recovering waste heat from the distillate and blow-down fluid by adding said heat to the incoming feed water. The vent condenser uses the cool feed water in heat exchange relation with the uncondensed steam or vapors exiting from the evaporator tube bundle for extracting heat from said steam or vapors as they are further condensed. The steam exhausted from the vent condenser purges the system of non-condensable gases to improve the efficiency of the system. The engine drives the vapor compressor and the plurality of pumps to provide the mechanical power and heat source for the unit, the whole unit being compact and highly efficient.

It is to be understood that the present disclosure is to be considered as an exemplification of the principles of the invention and is not intended to limit the invention to the embodiments illustrated. The full scope of the invention will be pointed out in the appended claims.

I claim:

1. An evaporation apparatus having an evaporator chamber, a tube bundle in said chamber, means for supplying fluid to said chamber to be evaporated, a manifold encompassing the ends of said tube bundle, vapor condensing means including a vent mounted integrally on one end of the evaporator chamber and communicating with said manifold on the exit end of said tube bundle, means for compressing vapors from said evaporator chamber and passing said compressed vapors through said manifold into said tube bundle for condensing distillate therefrom, said compressed vapors passing from said tube bundle into and through said vapor condensing means for further condensing distillate from said vapors, and heat exchange means for extracting heat from said distillate and adding heat to said fluid to be evaporated.

2. The apparatus as claimed in claim 1 including boiler means opening into said evaporator chamber, heating means for said boiler means, and means for supplying liquid in contact with said heating means for creating vapor in said chamber.

3. The apparatus as claimed in claim 1 wherein said fluid is passed through tubes in said vapor condensing means in heat exchange relation with said compressed vapors for recovering heat from said compressed vapors in the proces of condensing said vapors.

4. The apparatus as claimed in claim 1 wherein said fluid is sprayed over said tube bundle in said evaporator chamber for producing vapors in said chamber and means for removing concentrated unevaporated fluid from said chamber and discharging some as blow-down and recirculating the remainder back through the system for spraying again over said tube bundle.

5. The apparatus as claimed in claim 4 wherein said blow-down unevaporated fluid is passed through said heat exchanger for adding heat to said fluid to be evaporated.

6. In an evaporation apparatus comprising an evaporator chamber, a tube bundle in said chamber, a manifold encompassing the end of said tube bundle, vapor condensing means including a vent mounted integrally on one end of the evaporator chamber and communicating with said manifold on the exit end of said tube bundle, said vapor condensing means comprising tubes, means for passing impure feed water through the tubes in said vapor condensing means, said impure feed water being passed into said evaporator chamber over said tube bundle for producing vapor in said chamber, an exhaust gas boiler having a tank opening into said chamber, an engine, means for passing exhaust gases from said engine through said tank of said exhaust gas boiler, jacket water from the engine circulating in said tank of said exhaust gas boiler in heat exchange relation with said exhaust gases for extracting heat from said exhaust gases and adding heat and vapor to said evaporator chamber, means for compressing vapors from said evaporator chamber and passing said compressed vapors into said tube bundle through said manifold for extracting distillate therefrom, said vapor condensing means condensing more distillate from said compressed vapors, means for removing excess unevaporated feed water from said evaporator chamber and discharging a portion thereof from the system as blow-down, and heat exchange means for extracting heat from said distillate and blow-down and adding heat to said impure feed water.

7. The evaporation apparatus of claim 6 wherein said impure feed water is passed into said evaporator chamber and over said tube bundle as a spray.

8. The evaporation apparatus of claim 6 wherein said exhaust gas boiler comprises a tube bundle through which the exhaust gases from the engine pass and the jacket water from the engine is passed over said tube bundle to create vapors therefrom.

9. The evaporation apparatus of claim 6 wherein float valve means controls the addition of distillate to the jacket water in the exhaust gas boiler as make-up for the evaporated water.

10. In an evaporator apparatus comprising a base, an evaporator supported on said base and including a shell, a vapor condensing means mounted integrally on one end of said shell in direct communication with condensing vapors in said shell, exhaust gas boiler means in said shell in communication with the inside of said shell, a prime mover mounted on said base below and horizontally disposed relative to said shell, exhaust gases from said prime mover being circulated through said exhaust gas boiler as a source of heat, a heat exchange means mounted on said base underneath said shell, pump means mounted beneath said shell for separately circulating feed water and distillate and recirculating brine in the evaporator apparatus, and vapor compressor means mounted between said prime mover and said vapor condensing means on said shell, said prime mover driving said vapor compressor means to compress the vapors from the evaporator and to recirculate the comprsesed vapors to the condensing portion of the apparatus.

11. The apparatus as claimed in claim 10 including means for circulating distillate, feed water and blow-down brine through said heat exchanger for recovery of heat for the apparatus.

12. In an evaporator apparatus comprising a base, an evaporator supported on said base and including a shell, a vapor condensing means mounted integrally on one end of said evaporator in direct communication with condensing vapors in said shell, supplemental boiler means in said shell in communication with the inside of said shell, a separate source of heat for said supplemental boiler, a prime mover mounted on said base below and horizontally disposed relative to said shell, a heat exchange means mounted on said base underneath said shell, pump means mounted beneath said shell for separately circulating fluids through the apparatus, and vapor compressor means mounted between said prime mover and said vapor condensing means on said shell, said prime mover driving said vapor compressor means to compress the vapors from the evaporator for recirculation to the condensing portion of the evaporator and to the vapor condensing means for the production of distillate from said vapors.

13. The method of purifying impure feed water which comprises the steps of pumping incoming feed water in heat exchange relation with the cooling system of an engine, passing the said feed water then through a second heat exchange relation, this time with hot distillate and hot blow-down fluid, passing the feed water through a third heat exchange in a vapor condensing means including a vent mounted integrally on one end of an evaporator chamber and communicating with an evaporator chamber, passing said feed water then into said evaporating chamber in heat exchange with hot compressed vapors in a tube bundle for producing vapors therefrom, removing some excess unevaporated feed water from said evaporator chamber and passing it through said second heat exchange to give up heat to said incoming feed water and discharging same as blow-down, passing exhaust gases from said engine through a boiler in said evaporator chamber for producing additional vapors in said evaporator chamber, extracting the vapors from said evaporator chamber and compressing same, passing said compressed vapors as a heat source into said tube bundle in said evaporator chamber for providing heat for vaporizing said feed water in said evaporator chamber, condensing most of said vapors in the tube bundle as distillate, condensing more of said vapors into distillate in said vapor condensing means, passing said distillate through said second heat exchange to give up heat to said incoming feed water, and selectively bypassing said hot compressed vapors as a heat source past said tube bundle and injecting them into the evaporator chamber to mix with vapors being formed therein to provide additional vapors to be compressed during start up of the system.

References Cited

UNITED STATES PATENTS

| | | | |
|---|---|---|---|
| 1,150,713 | 8/1915 | Soderlund | 159—24 |
| 2,441,361 | 5/1948 | Kirgan | 202—181 |
| 2,537,259 | 1/1951 | Cleaver et al. | 203—10 X |
| 2,589,406 | 3/1952 | Latham | 203—24 X |
| 2,637,684 | 5/1953 | Buffum | 203—10 X |
| 3,245,883 | 4/1966 | Loebel | 203—7 |
| 3,236,748 | 2/1966 | Pottharst | 203—26 X |
| 3,252,501 | 5/1966 | Loebel et al. | 159—3 |

NORMAN YUDKOFF, Primary Examiner

F. E. DRUMMOND, Assistant Examiner

U.S. Cl. X.R.

202—177, 236; 203—100